No. 812,233. PATENTED FEB. 13, 1906.
M. C. ROCK.
TRIPOD HEAD.
APPLICATION FILED MAY 16, 1905.

Witnesses
NW Kuehne
John A. Percival.

Inventor
Montague C. Rock
By Richardson
Attorneys.

UNITED STATES PATENT OFFICE.

MONTAGUE CURTIS ROCK, OF SUNNYSIDE, ENGLAND.

TRIPOD-HEAD.

No. 812,233.        Specification of Letters Patent.        Patented Feb. 13, 1906.

Application filed May 16, 1905. Serial No. 260,680.

*To all whom it may concern:*

Be it known that I, MONTAGUE CURTIS ROCK, chemist's apprentice, a subject of His Majesty the King of Great Britain and Ireland, residing at Sunnyside, Royal Parade, Chiselhurst, in the county of Kent, England, have invented a certain new and useful Tripod-Head; and I do hereby declare the following to be a full, clear, and exact description of the invention, such as will enable others skilled in the art to which it appertains to make and use the same.

The object of the present invention is to provide a simple device for holding photographic cameras upon their stands or tripods, whereby the camera may be quickly and readily "reversed" without having to unscrew it from the stand, as is now necessary in the case of cameras not provided with reversing-backs.

My invention will be clearly understood from the annexed drawings, in which similar letters refer to corresponding parts in all the figures, and wherein—

Figure 3:
Figure 6:
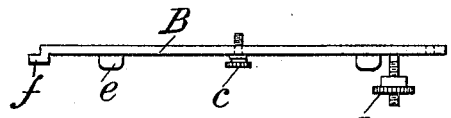
Figure 4:
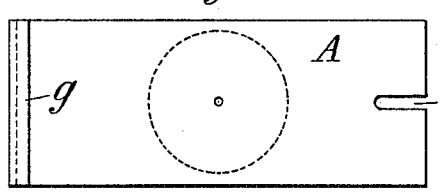
Figure 7:
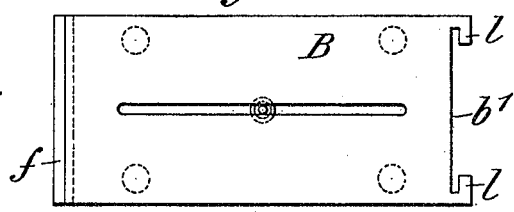
Figure 5:
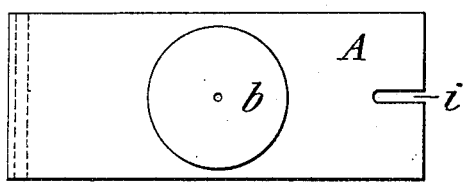
Figure 8:
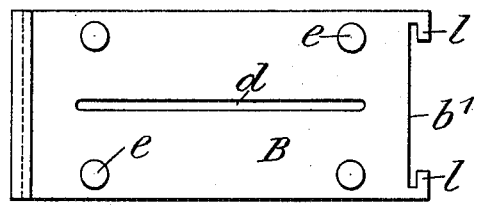
Figure 1:
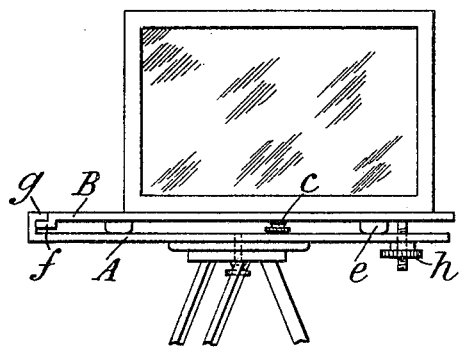
Figure 2:
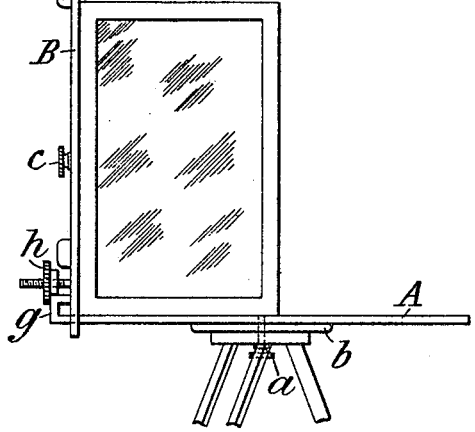

Figure 1 is a side elevation showing the complete device in its normal position. Fig. 2 shows the same holding the camera in its reversed position. Figs. 3, 4, and 5 show the lower or tripod plate member of the device in edge view, plan, and under side plan, respectively. Figs. 6, 7, and 8 are similar views of the upper or camera plate member.

The device comprises the two plate members A and B, whereof the lower or tripod plate member A is secured to the tripod-head by the thumb-screw $a$, which enters the boss $b$, formed or provided beneath such plate, while the upper or camera plate member B is secured to the longer side of the camera by the thumb-nut $c$, which passes through and is adjustable along the slot $d$, extending longitudinally of the said plate member B, or the latter may be incorporated with the side of the camera, if preferred. $e$ represents feet or distance-pieces beneath plate B, whereby space is provided for the said thumb-screw $c$ when the two plate members are superposed in parallel planes. (See Fig. 1.)

One end of plate member B is cranked or bent, as shown at $f$, so that when the device is in its normal position, Fig. 1, this end may engage beneath the right-angled retaining-flange $g$, provided to one end of plate A The two plate members may then be locked together by screwing up the thumb-nut $h$, whereof the threaded stem extending from the plate B passes through the slot $i$, extending inwardly from the other end of the tripod plate member A. At the other end $b'$ of the camera plate member B are two clip-pieces $l$, adapted to embrace the side edges and under surface of plate A when, the two plates being set at right angles, the latter is introduced between them and said end $b'$. The function of these clip-pieces is to hold the plate B against vertical and transverse movement relatively to plate A when the two plates are thus adjusted and also to guide plate B while being slid along plate A to the required position in which it is to be locked, as hereinafter described.

In using the device the longer side of the camera is secured to plate B by the thumb-screw $c$ and by means of slot $d$ is adjusted until its end is flush with the end $b'$ of plate B. The latter is then slid along plate A until its end $f$ engages beneath the right-angled retaining-flange $g$, when the two plates are secured together by tightening up the thumb-nut $h$, Fig. 1. If now it is desired to reverse the camera, the nut $h$ is slackened, the plate B, with camera attached, is released and tilted to a vertical position, the end of the tripod plate member A is introduced between the clip-pieces $l$ and the edge $b'$ of plate B, and the latter is slid along plate A until checked by the retaining-flange $g$ (which now performs the function of a stop) and is there locked in position by tightening up nut $h$, which holds plate B up to said stop against movement longitudinally of plate A.

What I claim, and desire to secure by Letters Patent of the United States, is—

1. In a device for the purpose set forth, the combination of a plate member adapted to be secured to the stand or tripod, a second plate member adapted to hold a camera and furnished at one end with clip-pieces between which and said end the tripod plate member may be introduced when the plates are set at right angles, a stop on the tripod plate member, means for holding the camera plate member up to this stop when the plate members are at right angles and means for securing the plate members together when superposed in parallel planes, substantially as described.

2. In a device for the purpose set forth, the combination of the plate member A adapted to be secured to the stand or tripod and having at one end the retaining-flange $g$ and at the other end the slot $i$, and the plate member B adapted to hold a camera and having one end adapted to engage beneath said flange $g$ and the other end provided with the clip-pieces $l$ and the screw and nut $h$, the whole arranged and adapted to operate substantially as described and illustrated.

In testimony whereof I have hereunto set my hand in the presence of two witnesses.

MONTAGUE CURTIS ROCK.

Witnesses:
 JOHN GEORGE PREBBLE,
 SYDNEY MARSHALL LENNOX.